United States Patent
Kuwajima et al.

(10) Patent No.: US 7,564,691 B2
(45) Date of Patent: Jul. 21, 2009

(54) OPENING AND CLOSING MECHANISM, AND ELECTRONIC DEVICE

(75) Inventors: Hideki Kuwajima, Kyoto (JP); Yasuchika Kudo, Fukui (JP)

(73) Assignee: Panasonic Corporation, Osaka (JP)

( * ) Notice: Subject to any disclaimer, the term of this patent is extended or adjusted under 35 U.S.C. 154(b) by 506 days.

(21) Appl. No.: 11/454,793

(22) Filed: Jun. 19, 2006

(65) Prior Publication Data
US 2006/0286842 A1    Dec. 21, 2006

(30) Foreign Application Priority Data
Jun. 20, 2005    (JP)    ............... 2005-178773

(51) Int. Cl.
*H05K 7/00*    (2006.01)
(52) U.S. Cl. ........................ 361/728; 361/755
(58) Field of Classification Search ........... 361/600, 361/679, 728–730, 752, 715, 755, 790, 797, 361/800; 455/575, 73, 550
See application file for complete search history.

(56) References Cited

U.S. PATENT DOCUMENTS

| | | | | |
|---|---|---|---|---|
| 6,822,871 B2* | 11/2004 | Lee et al. | ...... | 361/727 |
| 2004/0137940 A1* | 7/2004 | Matsunami | ...... | 455/550.1 |
| 2006/0146014 A1* | 7/2006 | Lehtonen | ...... | 345/156 |
| 2007/0232368 A1* | 10/2007 | Feightner et al. | ...... | 455/575.1 |
| 2008/0004083 A1* | 1/2008 | Ohki et al. | ...... | 455/566 |
| 2008/0125201 A1* | 5/2008 | Kim et al. | ...... | 455/575.4 |

FOREIGN PATENT DOCUMENTS

JP    2003-110675    4/2003

* cited by examiner

*Primary Examiner*—Hung S Bui
(74) *Attorney, Agent, or Firm*—Wenderoth, Lind & Ponack, L.L.P.

(57) ABSTRACT

An opening and closing mechanism includes a fixed member; a movable member disposed on the top face of this fixed member to be movable and rotatable in predetermined directions; a spring applying a spring force in the moving and rotating directions of this movable member; and a guide for restricting movement and rotation of the movable member.

28 Claims, 7 Drawing Sheets

OPENING AND CLOSING MECHANISM, AND ELECTRONIC DEVICE

BACKGROUND OF THE INVENTION

1. Field of the Invention

The present invention relates to opening and closing mechanisms used in a range of electronic devices such as mobile phones and personal computers, and also relates to electronic devices using the opening and closing mechanisms.

2. Background Art

With electronic devices such as mobile phones and personal computers becoming increasingly diversified and adopting ever more advanced features, many products are adopting designs that allow the opening and closing of a movable housing against a fixed housing for allowing diverse operations. The opening and closing mechanisms used in these electronic devices are also required to be inexpensive, easy to use, and suited to diverse operations.

An electronic device using a conventional opening and closing mechanism is described next with reference to FIGS. 6A and 6B, mainly using the example of a mobile phone.

FIGS. 6A and 6B are perspective views of a conventional mobile phone. In the drawings, operating panel 2 including such as ten keys for inputting numbers and characters, and voice input section 3 such as a microphone are provided on the top face of fixed housing 1.

Movable housing 4 is placed on the top face of fixed housing 1. Operating panel 5 including such as the power key and phone key, display 6 such as a liquid crystal display device, and voice output section 7 such as a speaker are formed on the top face of movable housing 4.

The electronic device is configured by attaching opening and closing mechanism 8 between fixed housing 1 and movable housing 4 such that this opening and closing mechanism 8 holds movable housing 4 relative to fixed housing 1 in a vertically movable fashion.

In the above structure, as shown in FIG. 6A, the user can receive and view TV programs on display 6, or select the menu displayed on display 6 by using operating panel 5 in a state where movable housing 4 is overlaid on fixed housing 1, which is a closed state.

For making phone calls, movable housing 4 is moved upward, as shown in FIG. 6B, exposing operating panel 2 and voice input section 3; and the user makes a phone call by operating this operating panel 2 or talks through voice input section 3 and voice output section 7.

Other than the above opening and closing mechanism which vertically moves movable housing 4, there are opening and closing mechanisms which rotate movable housing 4 relative to fixed housing 1 for opening and closing, as shown in FIGS. 7A, 7B, and 7C. FIG. 7A shows a closed state. From this state, movable housing 4 is rotatable through 90 degrees (first turn), as shown in FIG. 7B to set display 2 in a horizontally elongated state. This is convenient for receiving and viewing TV programs or inputting numbers and characters by operating exposed operating panel 2 while looking at display 6.

However, for phone calls, it is necessary to further rotate (second turn) movable housing 4, as shown in FIG. 7C, to bring voice input section 3 and voice output section 7 to the positions of the mouth and ear. Accordingly, it takes time to respond to an unanticipated call when the mobile phone is being used in the state after the first turn (i.e., the horizontally elongated state).

One prior art arrangement is disclosed in Japanese Patent Unexamined Publication No. 2003-110675.

In an electronic device using the above conventional opening and closing mechanism, the electronic device is opened or closed by moving or rotating movable housing 4 relative to fixed housing 1. Accordingly, multiple opening and closing mechanisms are needed for combined operations of movement and rotation in line with the growing diversification and adoption of more sophisticated features for devices. The structure thus becomes more complicated and expensive.

SUMMARY OF THE INVENTION

An opening and closing mechanism of the present invention solves a disadvantage of the prior art. The opening and closing mechanism of the present invention includes a fixed member; a movable member disposed on the top face of this fixed member in a movable and rotatable fashion in a predetermined direction; a spring applying a spring force in the moving and rotating directions of the movable member, and a guide for restricting movement and rotation of the movable member.

Furthermore, the present invention includes an electronic device such as a mobile phone as configured below using this opening and closing mechanism. The electronic device of the present invention includes a fixed housing provided with the fixed member; a movable housing provided with the movable member and disposed on the top face of the fixed housing in a movable and rotatable fashion in a predetermined direction; a spring which applies a spring force in the moving and rotating directions of this movable member; and a guide for restricting movement and rotation of the movable member.

This structure makes a range of operations feasible by means of a simple structure. The present invention can thus offer an inexpensive opening and closing mechanism and an electronic device using this opening and closing mechanism.

DETAILED DESCRIPTION OF THE INVENTION

A preferred embodiment of the present invention is described below with reference to drawings.

Figure 1:
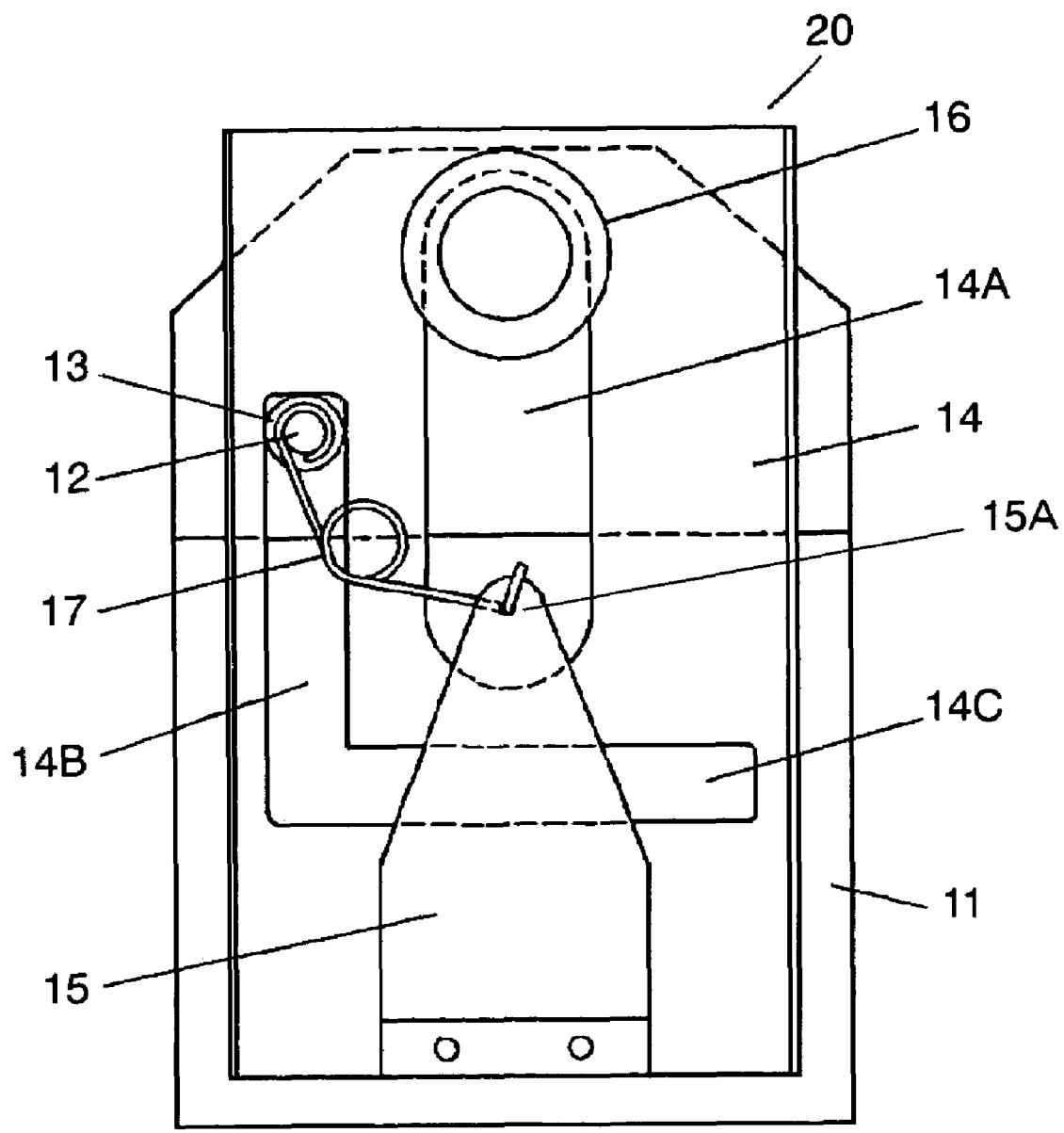
FIG. 1 is a plan view of an opening and closing mechanism in accordance with a preferred embodiment of the present invention.
Figure 2:
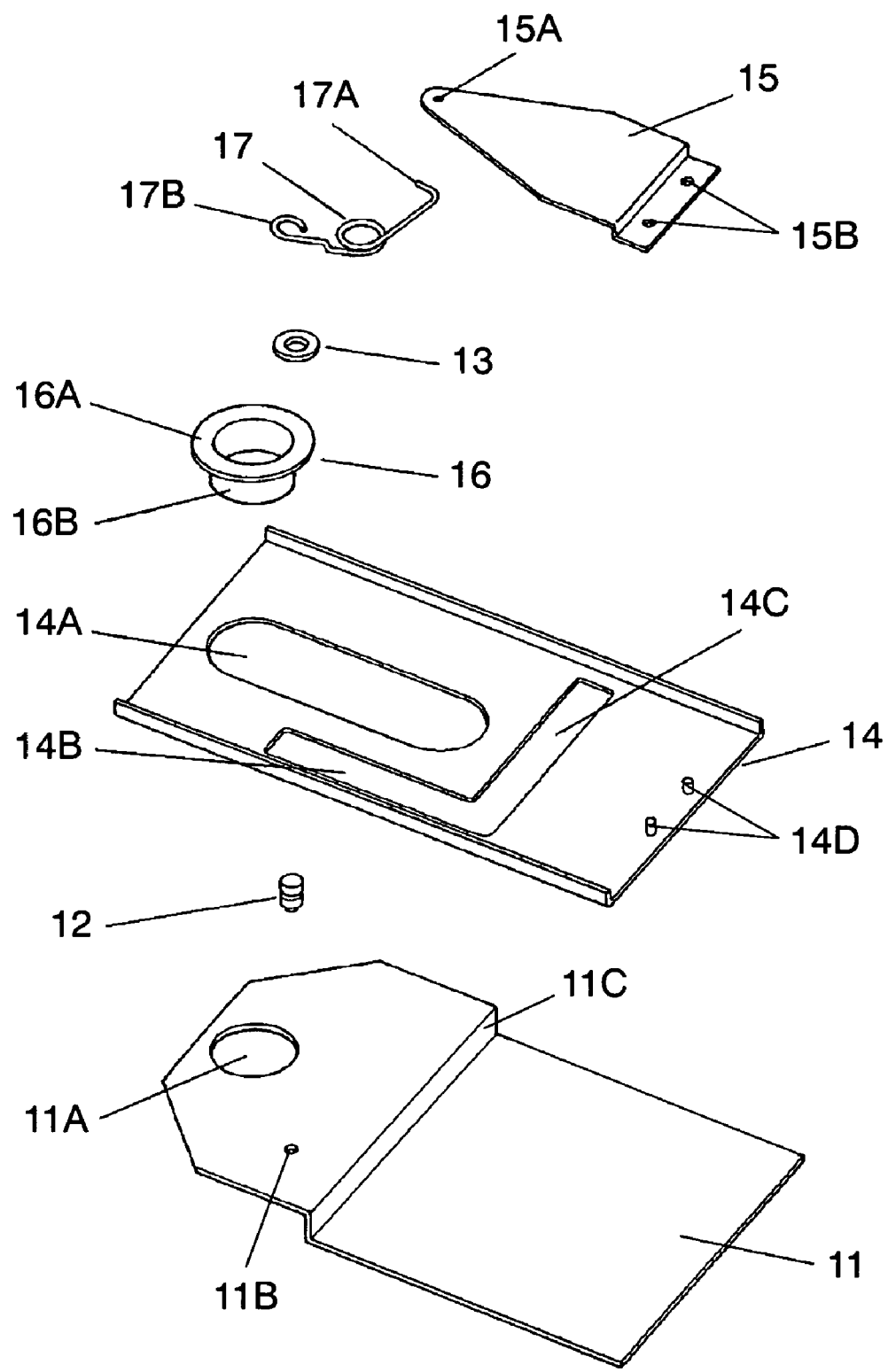
FIG. 2 is an exploded perspective view of the opening and closing mechanism in accordance with the preferred embodiment of the present invention.

FIG. 1 is a plan view of an opening and closing mechanism of the preferred embodiment of the present invention. FIG. 2 is an exploded perspective view of the opening and closing mechanism. In the drawings, plate-like fixed member 11 is made of metal such as steel or copper alloy, and has bent portion 11C which is bent upward at a middle part of the plate. Through hole 11A is created near an upper end of this fixed member 11. On the top face of fixed member 11, pin 12 is fixed to hole 11B, typically by caulking. Ring 13 is rotatably attached to this pin 12.

Movable member 14 is made of metal such as steel, copper alloy, or insulating resin. Elongated hole 14A and orthogonal L-shaped continuous holes 14B and 14C are provided in movable member 14. In addition, plate-like attachment plate 15 is fixed near the lower end of this movable member 14. Multiple pins 14D are provided on movable member 14, and these pins 14D are fixed in corresponding holes 15B on attachment plate 15, typically by caulking.

Roughly cylindrical stopper ring 16 is made of metal such as steel or copper alloy, and includes large-diameter head 16A and tube 16B. The bottom face of this head 16A contacts the top face of movable member 14. Tube 16B passes through elongated hole 14A and through hole 11A, and its lower end is fixed by caulking onto the bottom face of fixed member 11.

More specifically, stopper ring 16, whose lower end is fixed to fixed member 11, and elongated hole 14A form a guide between fixed member 11 and movable member 14. Movable member 14 is thus attached and placed on the top face of fixed member 11 in a movable and rotatable fashion.

Furthermore, ring 13, which is rotatably attached to pin 12 fixed to fixed member 11, is movably and rotatably inserted into continuous hole 14B on movable member 14. Pin 12, ring 13, and continuous holes 14B and 14C thus also form a guide between fixed member 11 and movable member 14. In short, these guides have the function of appropriately restricting movement and rotation of movable member 14 relative to fixed member 11.

Spring 17, made of steel or copper-alloy wire, is wound around its central portion, with both its ends made into latching parts 17A and 17B, forming a coil spring. This spring 17 is retained in a slightly bent state. Latching part 17A, i.e., one bent end, is latched to attachment hole 15A near the upper end of attachment plate 15 fixed to movable member 14; and latching part 17B, i.e., the other wound end, is latched to pin 12 fixed to fixed member 11.

Attachment hole 15A is disposed at the middle between the length directions of continuous holes 14B and 14C. At the same time, elongated hole 14A is created roughly parallel to continuous hole 14B. More specifically, one latching part 17A of spring 17 is disposed at an intersecting point (position of attachment hole 15A near the upper end of attachment plate 15) of two straight lines perpendicularly crossing respectively a middle part of continuous holes 14B and 14C. This 'middle part' does not mean the exact center, but near the center point.

In this structure, movable member 14 is given a downward force relative to fixed member 11 by attaching this spring 17 in a slightly bent state between fixed member 11 and movable member 14. The upper end of elongated hole 14A contacts stopper ring 16, and the upper end of continuous hole 14B contacts ring 13 such that movable member 14 is positioned and retained, thus configuring opening and closing mechanism 20.

Figure 3:
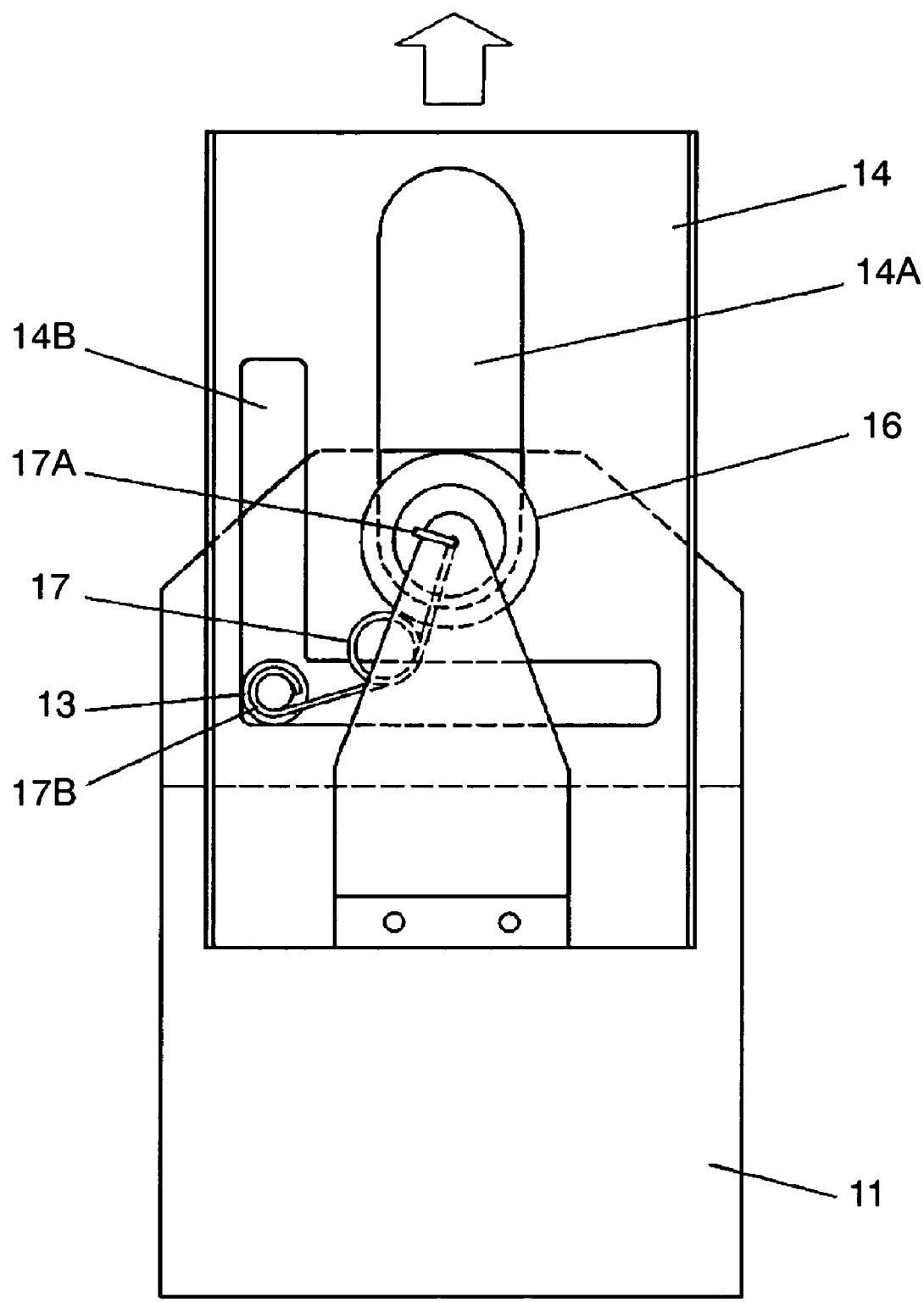
FIG. 3 is a plan view of when the opening and closing mechanism is moved.
Figure 4:
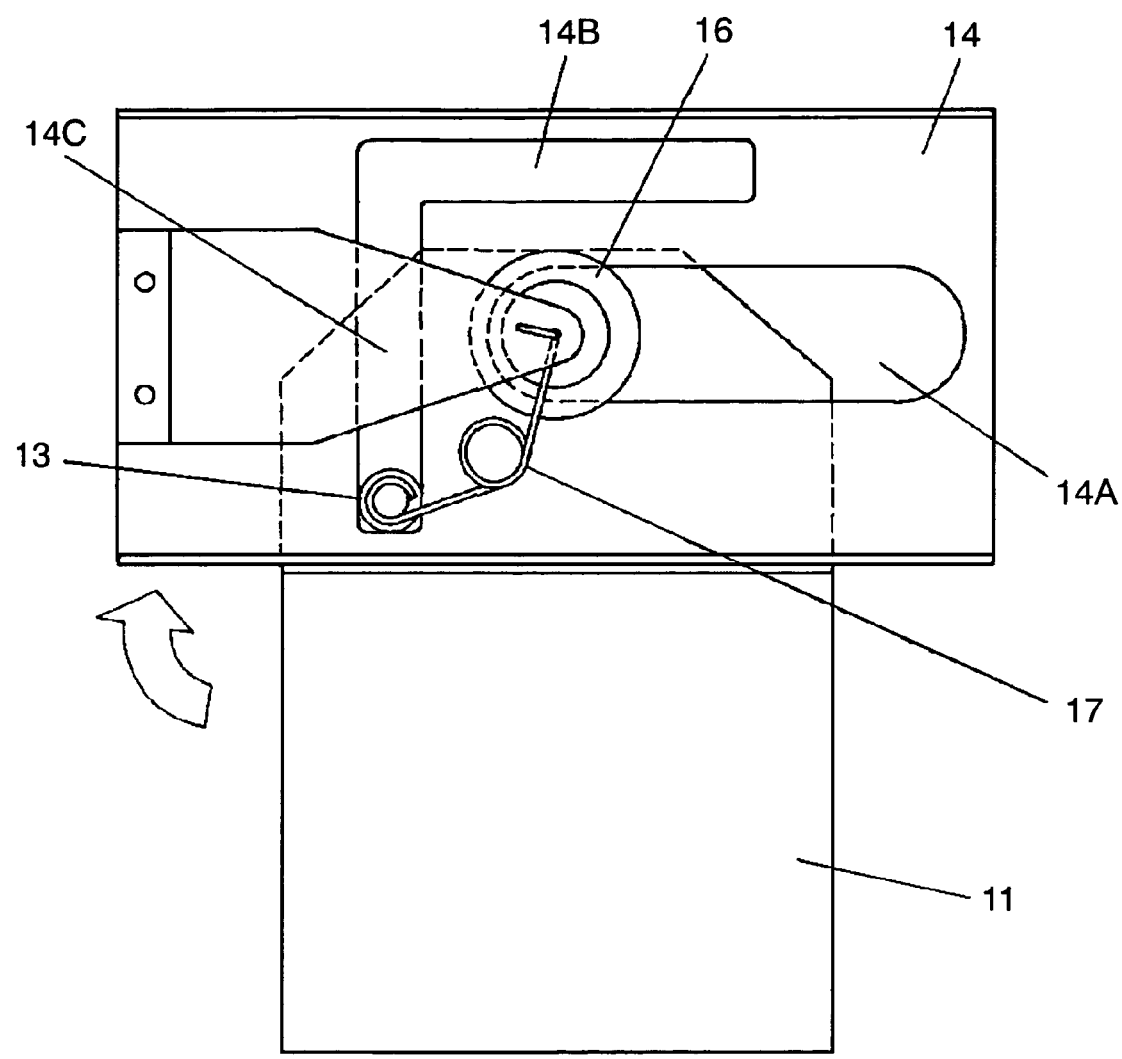
FIG. 4 is a plan view of when the opening and closing mechanism is rotated.
Figure 5A:
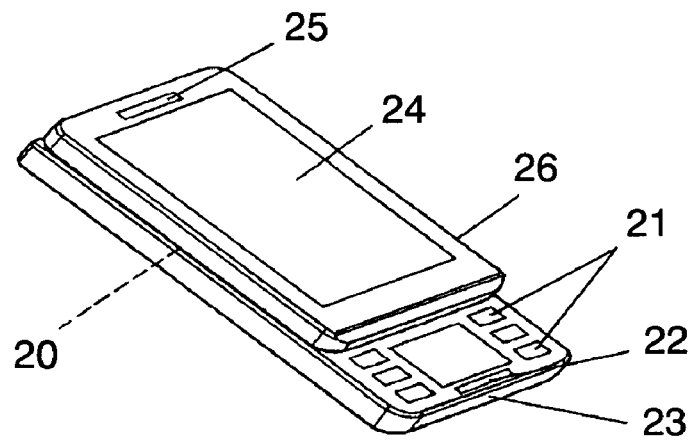
FIG. 5A is a perspective view of a mobile phone (electronic device) in accordance with the preferred embodiment of the present invention.
Figure 5B:
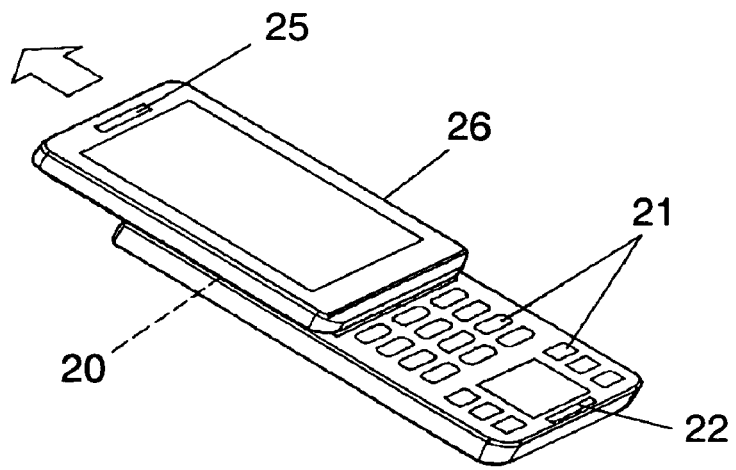
FIG. 5B is a perspective view of when the mobile phone is moved.
Figure 5C:
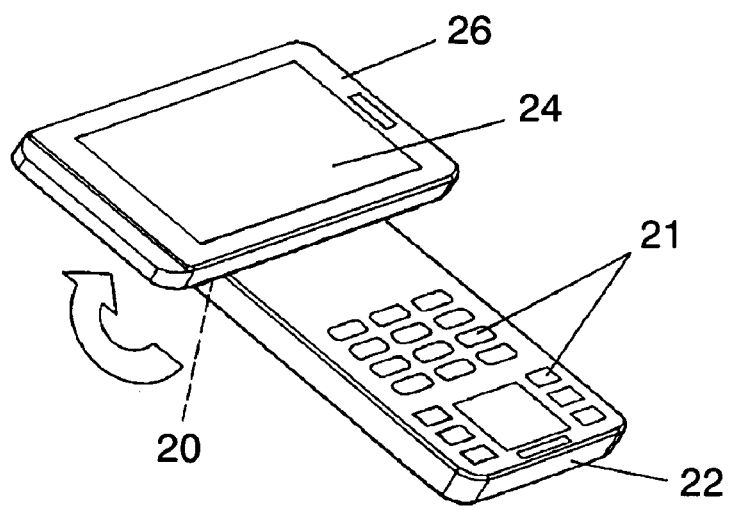
FIG. 5C is a perspective view of when the mobile phone is rotated.
Figure 6A:
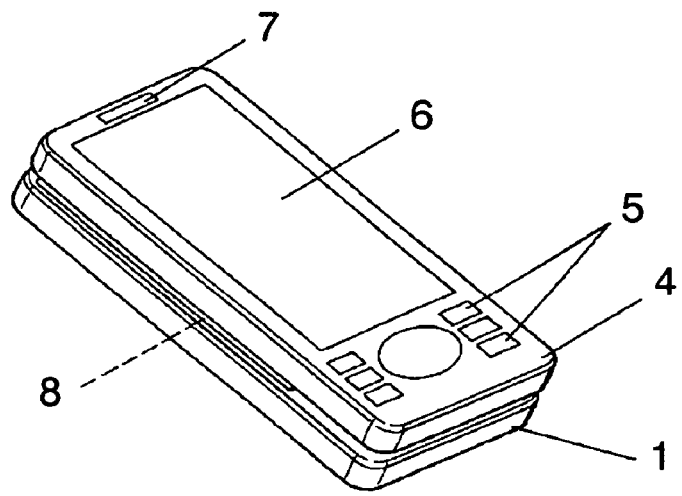
FIG. 6A is a conventional mobile phone (electronic device) in a closed state.
Figure 6B:
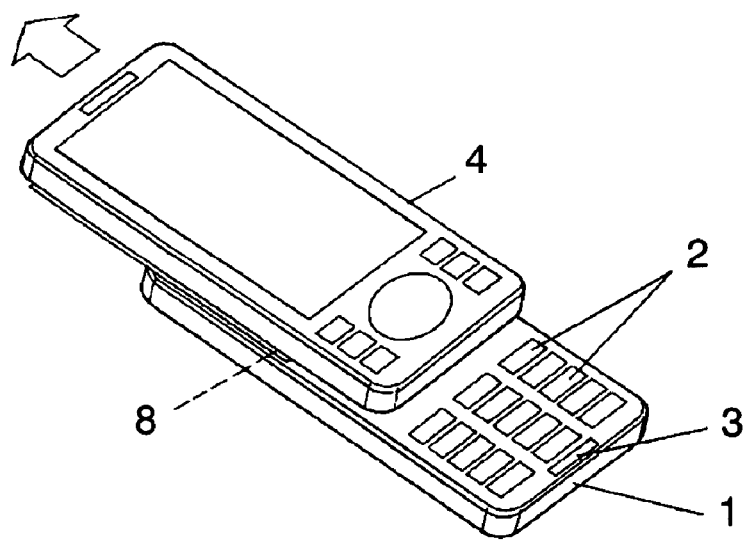
FIG. 6B is a perspective view of when the conventional mobile phone is moved.
Figure 7A:
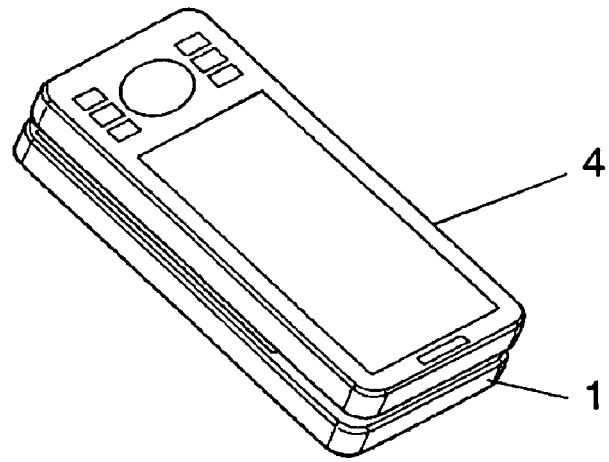
FIG. 7A is a perspective view of another conventional mobile phone (electronic device) in a closed state.
Figure 7B:
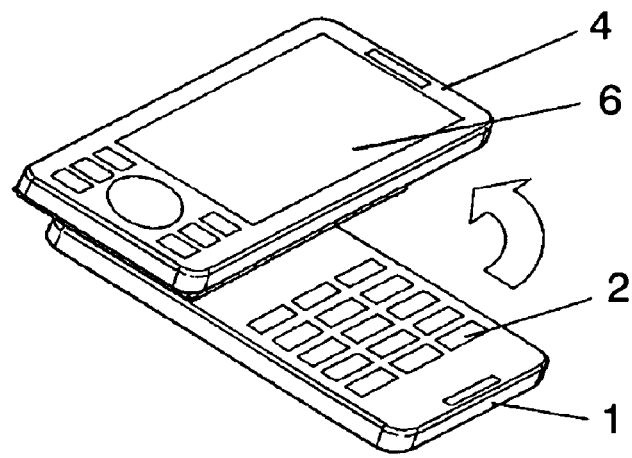
FIG. 7B is a perspective view of the conventional mobile phone in the state after a first turn of a movable member.
Figure 7C:
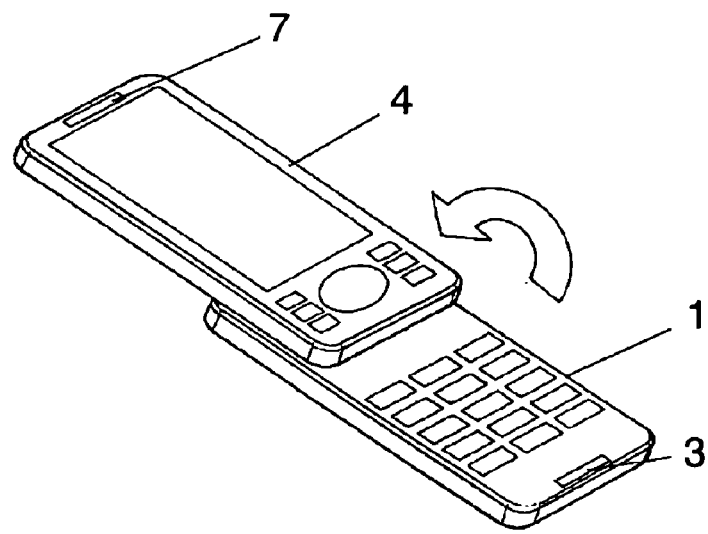
FIG. 7C is a perspective view of the conventional mobile phone in the state after a second turn of a movable member.

The operation of this opening and closing mechanism 20 is described next. FIG. 3 is a plan view of when opening and closing mechanism 20 is moved. FIG. 4 is a plan view of when opening device 20 is rotated. FIG. 5A is a perspective view of a closed state of a mobile phone (electronic device) in which this opening and closing mechanism is assembled. FIG. 5B is a perspective view of when the mobile phone is moved, and FIG. 5C is a perspective view of when the mobile phone is rotated.

Fixed member 11 is attached and fixed to fixed housing 23 which has, formed on its top face, operating panel 21 including such as a power key, phone key, and ten keys; and voice input section 22 such as a microphone. Movable member 14 is attached and fixed to movable housing 26 on which are formed display 24 such as a liquid crystal display device and voice output section 25 such as a speaker. A mobile phone (electronic device) is configured by movably and rotatably holding movable housing 26 relative to fixed housing 23 using opening and closing mechanism 20.

In the above structure, movable housing 26, to which movable member 14 is attached, is held in a closed state relative to fixed housing 23, as shown in FIG. 5A, when spring 17 applies a downward force to movable member 14 relative to fixed member 11, as shown in FIG. 1.

When movable housing 26 is moved upward (indicated by the arrow) by hand, as shown in FIG. 5B, from this closed state; movable member 14 attached to movable housing 26 is moved upward (indicated by the arrow), as shown in FIG. 3, as elongated hole 14A is guided by stopper ring 16 and continuous hole 14B is guided by ring 13. When the position of latching part 17A of spring 17 becomes protruded upward relative to latching part 17B, the spring inverts.

Then, movable member 14 given an upward force by spring 17 further moves. When the lower end of long hole 14A contacts stopper ring 16 and the lower end of continuous hole 14B contacts ring 13, movable member 14 is retained at that position and movable housing 26 is set to the state in which it is moved upward and opened.

More specifically, when the phone rings in the closed state of movable housing 26, as shown in FIG. 5A, movable housing 26 is moved upward by hand to open movable housing 26 with opening and closing mechanism 20, as shown in FIG. 5B, such that the entire operating panel 21 is exposed for operation, and voice input section 22 and voice output section 25 can be held at the positions of the mouth and ear to permit talking over the phone.

During this vertical movement, the inversion force of spring 17 moves movable housing 26 and retains it at either the open or closed position even if the user releases the hand in the middle of the opening or closing operation. This is because the upward or downward force is applied from a predetermined position to movable housing 26 to which movable member 14 is attached. In other words, spring 17 has a limiting point at which the direction of spring force applied to movable housing 26 (movable member 14) is inverted in the middle part of movement of movable housing 26 (movable member 14) in the moving direction.

In addition, since movable member 14 is moved and retained by the guides provided between fixed member 11 and movable member 14, such as elongated hole 14A and stopper ring 16, and continuous hole 14B and ring 13; movable housing 26 can be moved smoothly without any rattling. The guides also ensure that movable housing 26 is retained in either the open or the closed position.

Then, when movable housing 26 is rotated clockwise (indicated by the arrow), as shown in FIG. 4, from this state, movable member 14 rotates on the end of elongated hole 14A contacting stopper ring 16 as a fulcrum. Ring 13 also moves from continuous hole 14B to continuous hole 14C, and continuous hole 14C is also guided by ring 13 and rotates while bending spring 17. When the lower end of continuous hole 14C contacts ring 13, movable member 14 is retained at this position, and movable housing 26 is set to the state in which it is rotated through 90 degrees clockwise.

More specifically, when movable housing 26 is rotated clockwise (indicated by the arrow) by hand, as shown in FIG. 5C, from the state where movable housing 26 is moved upward, as shown in FIG. 5B; opening and closing mechanism 20 makes movable housing 26 lie horizontally to allow the viewing of a received TV program on display 24 or operating exposed operating panel 21 and inputting numbers and characters while looking at display 24.

Also in this rotating operation, movable member 14 is rotated and retained by the spring force of spring 17 and the guides such as elongated hole 14A and stopper ring 16, and continuous hole 14C and ring 13. Accordingly, movable housing 26 can be rotated smoothly and reliably retained at a position rotated through 90 degrees.

The preferred embodiment of the present invention, as described above, enables combined operations of movement and rotation with a simple structure by placing movable member 14 on the top face of plate-like fixed member 11 in a movable and rotatable fashion in a predetermined direction, and also providing spring 17 for applying a spring force in the moving and rotating directions of this movable member 14. Accordingly, the present invention offers an easy-to-use and inexpensive opening and closing mechanism and an electronic device using this opening and closing mechanism.

Furthermore, the guides for moving and rotating movable member 14 in a predetermined direction, such as elongated hole 14A and stopper ring 16, and continuous holes 14B and 14C and ring 13; are provided between fixed member 11 and movable member 14 in the preferred embodiment. This enables smooth operations and reliable retention at a predetermined position, further improving the usability of the opening and closing mechanism.

In the above description, movable member 14 is completely moved upward using L-shaped continuous holes 14B and 14C, and then rotated to a horizontally-elongated position. It is apparent that other diverse operations are feasible. For example, another continuous hole 14C roughly parallel to continuous hole 14C can be created in the middle part of the length direction of continuous hole 14B for rotating movable member 14 in the middle of upward movement.

Furthermore, elongated hole 14A and orthogonal L-shaped continuous holes 14B and 14C are provided, and attachment hole 15A to which latching part 17A of spring 17 is latched is disposed at the middle between length directions of continuous holes 14B and 14C in the above description. However, attachment hole 15A can be provided at any point in the area within the length directions of continuous holes 14B and 14C, in relation to set positions of limiting points for inverting the spring force applied in the moving and rotating direction of movable member 14.

Furthermore, diverse types of springs, including a leaf spring bent roughly into a U-shape or coil spring which is spirally wound, can be used as spring 17 for applying a spring force to movable member 14, other than the coil spring in the description whose central portion is wound.

What is claimed is:

1. An opening and closing mechanism comprising:
a fixed member;
a movable member disposed on a top face of the fixed member to rotate and linearly move in a predetermined direction with respect to said fixed member;
a spring for applying a spring force in a moving direction and a rotating direction of the movable member;
a guide for restricting movement and rotation of the movable member; and
wherein the spring has a limiting point at which a direction to apply the spring force to the movable member inverts, the liming point being provided on at least one of a middle part in the moving direction and a middle part in the rotating direction of the movable member.

2. The opening and closing mechanism as defined in claim 1, wherein the spring is configured with a single member.

3. The opening and closing mechanism as defined in claim 2, wherein the spring is a coil spring whose central portion is wound, and which has ends that constitute latching parts.

4. The opening and closing mechanism as defined in claim 1, wherein the guide comprises a stopper ring and a pin fixed to the fixed member, and an elongated hole and a continuous hole provided in the movable member; and
wherein the elongated hole corresponds to the stopper ring, and the continuous hole corresponds to the pin.

5. The opening and closing mechanism as defined in claim 4, wherein the continuous hole has an orthogonal L-shape, with its one side parallel to the elongated hole.

6. The opening and closing mechanism as defined in claim 5, wherein the spring has one latching part at an intersecting point of two straight lines perpendicularly crossing a middle part of each side of the L-shaped continuous hole.

7. The opening and closing mechanism as defined in claim 4, wherein the guide further comprises a ring rotatably attached to the pin.

8. An electronic device comprising:
a fixed housing including a fixed member;
a movable housing including a movable member, the movable housing being disposed on a top face of the fixed housing to rotate and linearly move in a predetermined direction with respect to said fixed housing;
a spring applying a spring force in a moving direction and a rotating direction of the movable member;
a guide for restricting movement and rotation of the movable member; and
wherein the spring has a limiting point at which a direction to apply the spring force to the movable member inverts, the liming point being provided on at least one of a middle part in the moving direction and a middle part in the rotating direction of the movable member.

9. The electronic device as defined in claim 8, wherein the spring is configured with a single member.

10. The electronic device as defined in claim 9, wherein the spring is a coil spring whose central portion is wound, and which has ends that constitute latching parts.

11. The electronic device as defined in claim 8, wherein the guide comprises a stopper ring and a pin fixed to the fixed member, and an elongated hole and a continuous hole provided in the movable member; and
wherein the elongated hole corresponds to the stopper ring, and the continuous hole corresponds to the pin.

12. The electronic device as defined in claim 11, wherein the continuous hole has an orthogonal L-shape, with its one side parallel to the elongated hole.

13. The electronic device as defined in claim 12, wherein the spring has one latching part at an intersecting point of two straight lines perpendicularly crossing a middle part of each side of the L-shaped continuous hole.

14. The electronic device as defined in claim 11, wherein the guide further comprises a ring rotatably attached to the pin.

15. An opening and closing mechanism comprising:
a fixed member;
a movable member disposed on a top face of the fixed member so as to be movable and rotatable in predetermined directions;
a spring for applying a spring force in a moving direction and a rotating direction of the movable member; and
a guide for restricting movement and rotation of the movable member;
wherein the guide comprises a stopper ring and a pin fixed to the fixed member, and an elongated hole and a continuous hole provided in the movable member; and
wherein the elongated hole corresponds to the stopper ring, and the continuous hole corresponds to the pin.

16. The opening and closing mechanism as defined in claim 15, wherein the spring is configured with a single member.

17. The opening and closing mechanism as defined in claim 16, wherein the spring is a coil spring whose central portion is wound, and which has ends that constitute latching parts.

18. The opening and closing mechanism as defined in claim 15, wherein the spring has a limiting point at which a direction to apply the spring force to the movable member inverts, the liming point being provided on at least one of a middle part in the moving direction and a middle part in the rotating direction of the movable member.

19. The opening and closing mechanism as defined in claim 15, wherein the continuous hole has an orthogonal L-shape, with its one side parallel to the elongated hole.

20. The opening and closing mechanism as defined in claim 19, wherein the spring has one latching part at an intersecting point of two straight lines perpendicularly crossing a middle part of each side of the L-shaped continuous hole.

21. The opening and closing mechanism as defined in claim 15, wherein the guide further comprises a ring rotatably attached to the pin.

22. An electronic device comprising:
a fixed housing including a fixed member;
a movable housing including a movable member, the movable housing being disposed on a top face of the fixed housing so as to be movable and rotatable in predetermined directions;
a spring applying a spring force in a moving direction and a rotating direction of the movable member; and
a guide for restricting movement and rotation of the movable member;
wherein the guide comprises a stopper ring and a pin fixed to the fixed member, and an elongated hole and a continuous hole provided in the movable member; and
wherein the elongated hole corresponds to the stopper ring, and the continuous hole corresponds to the pin.

23. The electronic device as defined in claim 22, wherein the spring is configured with a single member.

24. The electronic device as defined in claim 23, wherein the spring is a coil spring whose central portion is wound, and which has ends that constitute latching parts.

25. The electronic device as defined in claim 22, wherein the spring has a limiting point at which a direction to apply the spring force to the movable member inverts, the liming point being provided on at least one of a middle part in the moving direction and a middle part in the rotating direction of the movable member.

26. The electronic device as defined in claim 22, wherein the continuous hole has an orthogonal L-shape, with its one side parallel to the elongated hole.

27. The electronic device as defined in claim 26, wherein the spring has one latching part at an intersecting point of two straight lines perpendicularly crossing a middle part of each side of the L-shaped continuous hole.

28. The electronic device as defined in claim 22, wherein the guide further comprises a ring rotatably attached to the pin.

* * * * *